United States Patent
Inquiete et al.

(10) Patent No.: US 10,472,055 B2
(45) Date of Patent: Nov. 12, 2019

(54) RESONATOR, AND AN AIRCRAFT FITTED WITH THE RESONATOR

(71) Applicant: AIRBUS HELICOPTERS, Marignane (FR)

(72) Inventors: Guillaume Inquiete, Aix en Provence (FR); Paul Cranga, Marseilles (FR); Simon Chesne, Lyons (FR)

(73) Assignee: AIRBUS HELICOPTERS, Marignane (FR)

( * ) Notice: Subject to any disclaimer, the term of this patent is extended or adjusted under 35 U.S.C. 154(b) by 211 days.

(21) Appl. No.: 15/610,735

(22) Filed: Jun. 1, 2017

(65) Prior Publication Data

US 2017/0349271 A1 Dec. 7, 2017

(30) Foreign Application Priority Data

Jun. 2, 2016 (FR) .................... 16 00893

(51) Int. Cl.
| | |
|---|---|
| *F16F 15/03* | (2006.01) |
| *F16F 7/10* | (2006.01) |
| *G01P 1/00* | (2006.01) |
| *G01P 15/08* | (2006.01) |
| *B64C 27/00* | (2006.01) |

(52) U.S. Cl.
CPC .......... *B64C 27/001* (2013.01); *F16F 7/1005* (2013.01); *F16F 15/03* (2013.01); *G01P 1/003* (2013.01); *G01P 15/08* (2013.01); *B64C 2027/004* (2013.01); *B64C 2027/005* (2013.01)

(58) Field of Classification Search
CPC ............ B64C 27/001; B64C 2027/004; B64C 2027/005; F16F 7/1005; F16F 15/03; G01P 15/08; G01P 1/003

USPC .......................................................... 73/653
See application file for complete search history.

(56) References Cited

U.S. PATENT DOCUMENTS

| | | |
|---|---|---|
| 5,620,068 A | 4/1997 | Garnjost et al. |
| 5,853,144 A | 12/1998 | Vincent |
| 6,067,853 A | 5/2000 | Thevenot |
| 6,279,704 B1 | 8/2001 | Manfredotti |
| 6,393,913 B1* | 5/2002 | Dyck .................. G01P 15/0802 333/186 |
| 6,826,493 B1* | 11/2004 | Mangalam .............. G01M 9/06 702/45 |
| 8,616,353 B2 | 12/2013 | Manfredotti |

(Continued)

FOREIGN PATENT DOCUMENTS

| | | |
|---|---|---|
| EP | 2039957 | 3/2009 |
| EP | 2845799 | 3/2015 |

(Continued)

OTHER PUBLICATIONS

French Search Report for French Application No. FR 1600893, Completed by the French Patent Office, dated Feb. 22, 2017, 8 Pages.

*Primary Examiner* — Jacques M Saint Surin
(74) *Attorney, Agent, or Firm* — Brooks Kushman P.C.

(57) ABSTRACT

A resonator having a support and a seismic mass. Movement means include a first electromagnetic assembly comprising a first electric coil that is not electrically powered. An actuator is connected to a processor unit, the processor unit electrically powering the actuator with adjustable electrical power. A resilient member is interposed between said seismic mass and said support.

23 Claims, 4 Drawing Sheets

(56) References Cited

U.S. PATENT DOCUMENTS

| | | | |
|---|---|---|---|
| 9,592,909 B2 | 3/2017 | Cranga et al. | |
| 2008/0309910 A1* | 12/2008 | Takahashi | F16F 15/027 355/72 |
| 2009/0020381 A1 | 1/2009 | Hindle et al. | |
| 2011/0147512 A1* | 6/2011 | Cranga | B64C 27/001 244/17.27 |
| 2011/0155841 A1* | 6/2011 | Cranga | B64C 27/001 244/17.11 |
| 2014/0159827 A1* | 6/2014 | Hofmann | B81B 3/0018 331/154 |
| 2015/0268127 A1* | 9/2015 | Berchtold | G01N 3/38 73/662 |

FOREIGN PATENT DOCUMENTS

| | | |
|---|---|---|
| FR | 2770825 | 5/1999 |
| FR | 2784350 | 4/2000 |
| FR | 2961570 | 12/2011 |

\* cited by examiner

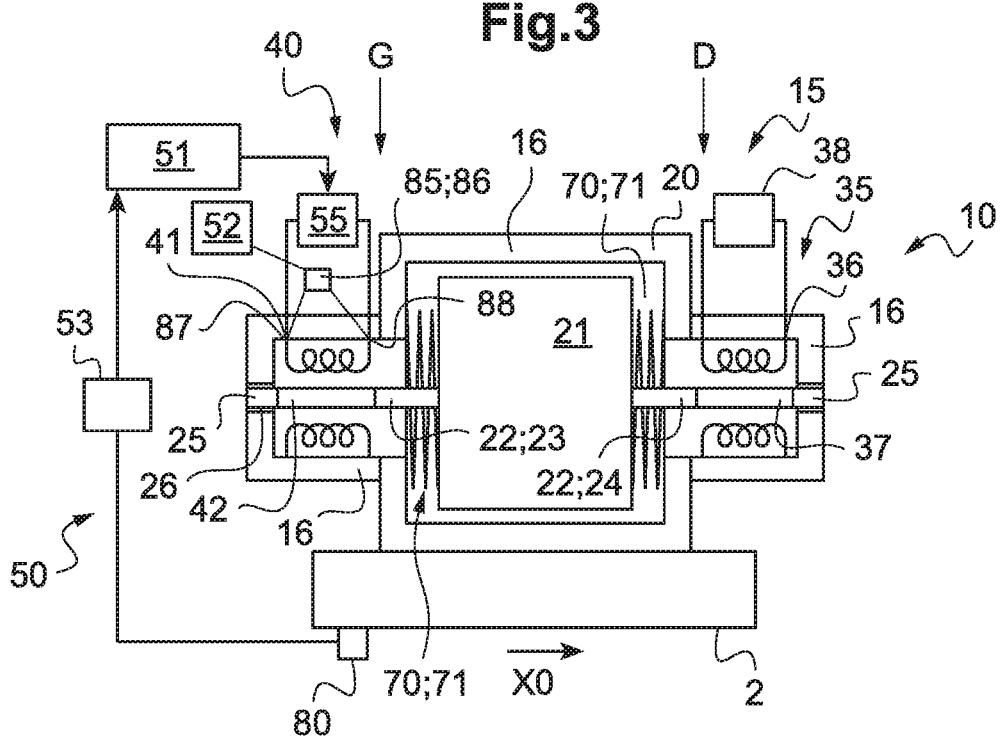
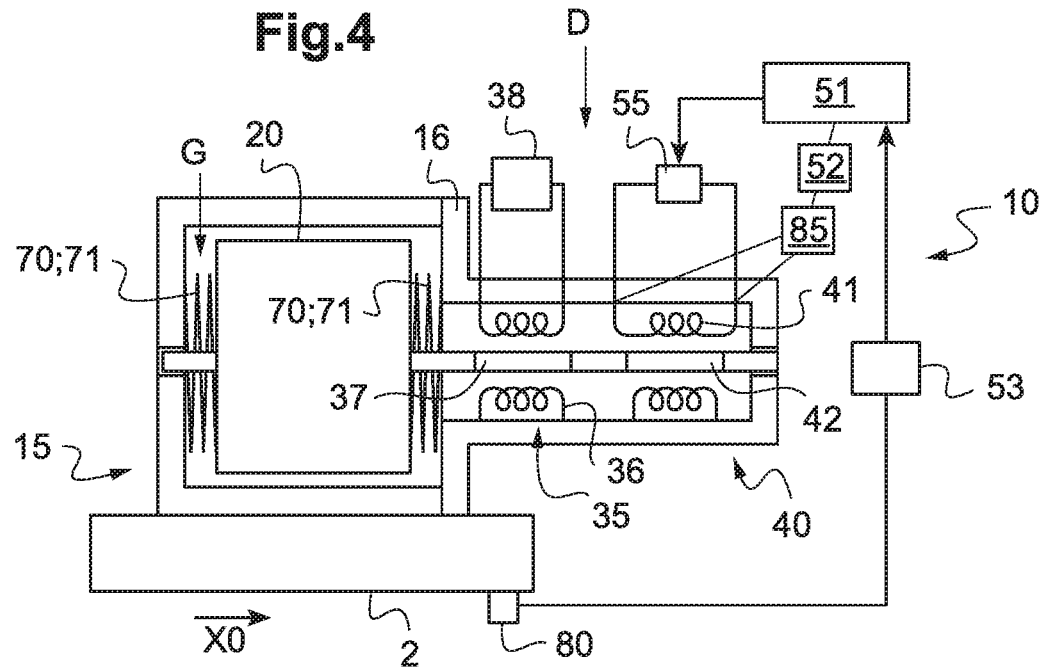

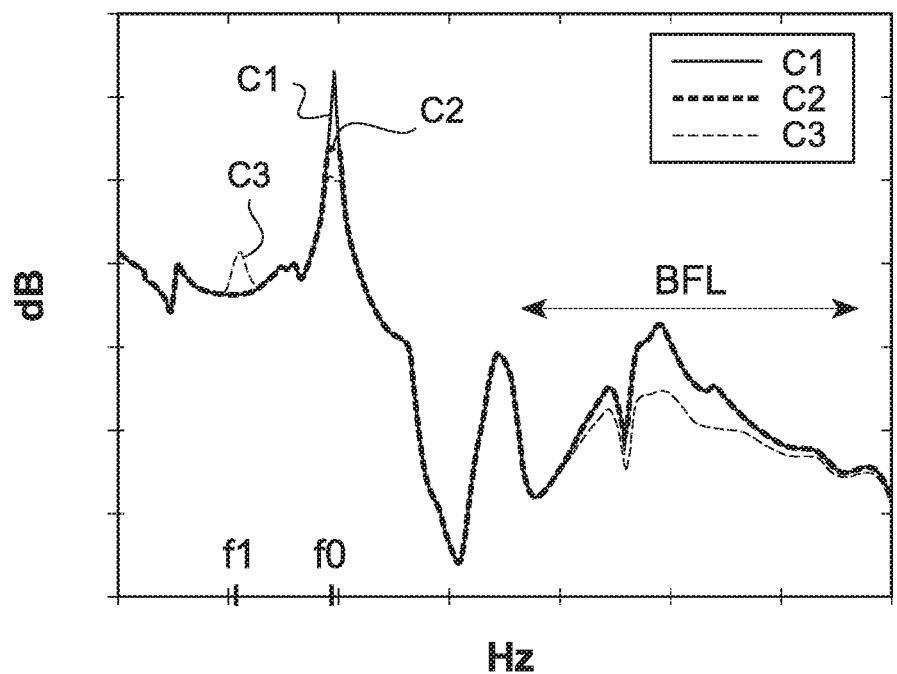

RESONATOR, AND AN AIRCRAFT FITTED WITH THE RESONATOR

CROSS-REFERENCE TO RELATED APPLICATIONS

This application claims priority to European patent application No. FR 16 00893 filed on Jun. 2, 2016, the disclosure of which is incorporated in its entirety by reference herein.

BACKGROUND OF THE INVENTION (1) Field of the Invention

The present invention relates to a resonator and to an aircraft fitted with the resonator.

The present invention relates to mechanisms seeking to reduce a level of vibration. In particular, the present invention relates to mechanisms seeking to reduce vibrations induced by aeroelastic instabilities that result from coupling between the vibratory modes of the carrier structure of an aircraft and the vibratory modes of a rotor of the aircraft. Such a mechanism can possibly be used to treat excitations of a helicopter tail boom, and in particular to treat the phenomenon known as "tail shake". The invention provides such a mechanism and an aircraft provided with such a mechanism.

(2) Description of Related Art

Among aircraft, rotorcraft are provided with at least one main rotor connected to an airframe. The main rotor contributes at least in part to providing the aircraft with lift and possibly also propulsion.

Furthermore, engines suitable for driving rotation of the main rotor are arranged in the airframe. Under such circumstances, the airframe includes a mounting structure for the rotor enabling the main rotor to be fastened to the airframe.

Such a mounting structure usually includes a main power transmission gearbox (MGB). The main gearbox is driven by the engines of the aircraft. Furthermore, the main gearbox is provided with a rotor mast for driving the main rotor in rotation.

In addition, the mounting structure includes fastener elements for fastening the main gearbox to a platform of the airframe. For example, a mounting structure of a rotorcraft, referred to by the person skilled in the art as a "pylon", comprises both a main gearbox and suspension bars.

The airframe and the main rotor are each subjected to forced excitations inherent to the speed of advance of the aircraft. For example, the tail boom of a helicopter airframe may be excited directly by a turbulent air stream coming from the main rotor.

In addition to forced excitations, another vibratory phenomenon can give rise to vibratory problems on an aircraft.

Such a problem lies in the attenuation of vibratory phenomena induced by the aeroelastic instabilities to which an aircraft is subjected in flight. For example, such aeroelastic instabilities may result from the coupling between the vibratory modes of the carrier structure that is caused by aerodynamic effects due to the stream of air moving around said carrier structure, and in particular a structure of the fixed wing or rotary wing type. Such instabilities are known to the person skilled in the art in particular under the general term "flutter".

Other aeroelastic instabilities correspond by way of example to instabilities known as "whirl flutter", designating an instability that appears for rotating systems placed in an air stream. By way of example, such instability can result from coupling between the vibratory modes of a bladed rotor and the vibratory modes of the carrier structure supporting the rotor.

These phenomena of "flutter" and of "whirl flutter" are characterized by limit cycle vibration or by diverging vibration that can lead to mechanical parts or structural elements breaking.

These instabilities are generally avoided by suitably selecting mode characteristics for the rotor and/or for the carrier structure. An instability appearing on an existing aircraft thus requires structural modifications to the rotor and/or to the carrier structure, which modifications may be considerable.

Rotorcraft are structured in general terms to mitigate the consequences of such vibration.

Specifically, the rotor or the airframe may be fitted with antivibration systems, sometimes referred to as "resonators", that serve to minimize the level of vibration.

The function of a resonator is to generate vibration locally to produce effects that counter the unwanted vibration of a carrier structure.

Thus, a resonator conventionally comprises a member referred to as a "seismic mass" or a "moving mass" connected to a support via movement means. The movement means provide the seismic mass with a degree of freedom to move. The movement of the seismic mass is then coupled to the movement of the carrier structure in order to counter the excitation exerted on the carrier structure.

In particular, coupling between the movement of the seismic mass and the movement of the carrier structure can be achieved by using a passive resonator with preponderant stiffness. The movement means of such a resonator then present stiffness that is preponderant relative to other characteristics, and in particular relative to the damping generated by the movement means. The damping is considered as being negligible in the context of a passive resonator with predominant stiffness.

A known passive resonator with preponderant stiffness then includes a seismic mass connected to a carrier structure via a blade type flexible connection.

When the carrier structure is excited in a direction substantially orthogonal to the blade, the seismic mass performs rocking movement.

The effect of the passive resonator with preponderant stiffness is to "smother" the vibration that is giving rise to the movement of the carrier structure by creating antiresonance at a given antiresonance frequency setting. In contrast, a passive resonator with preponderant stiffness generates two new modes of vibration having two respective resonant frequencies that are situated on either side of the antiresonance frequency. The frequency range extending between these two modes of vibration remains relatively narrow.

Under certain circumstances, the two modes of vibration created by the resonator are not troublesome, insofar as the two resonant frequencies that are created differ from the given antiresonance frequency that is to be treated.

Document FR 2 961 570 proposes a semi-active resonator enabling a seismic mass to be moved manually relative to a blade in order to enable the resonator to treat vibratory phenomena that takes place at various different frequencies.

Another known resonator is a damped resonator. The movement means of such a damped resonator then present stiffness that is not preponderant relative to the damping generated by the movement means.

Consequently, the movement means present stiffness and a damping coefficient that are both non-negligible. For example, the movement means may comprise a first member presenting non-negligible stiffness and a second member presenting a non-negligible damping coefficient. By way of example, the first member may be in the form of a deformable member. The second member may be obtained from electromagnetic means having an electric coil and a permanent magnet.

When the carrier structure vibrates, the damped resonator then vibrates in phase quadrature relative to the carrier structure for treatment and thus opposes the movement of the carrier structure.

The mass per se of the seismic mass is selected as a function of the mass of the carrier structure and of the damping to be provided.

The movement means may in particular be adjusted so as to provide optimum damping that makes it possible to minimize the response of the carrier structure over a frequency band.

If the damping provided is small, then the damped resonator behaves like a resonator with preponderant stiffness by causing two resonant peaks to appear on either side of the treated antiresonance frequency. Conversely, if the damping provided is large, then the damped resonator has little impact on the response of the structure. In contrast, when the damping coefficient of the movement means is suitably chosen, the amplitude of the treated vibration at the frequency setting of the resonator is reduced, but without that creating two resonance peaks. Adjustment of the damped resonator thus seeks to achieve a compromise between the desired attenuation of the vibration for treatment at a particular frequency and the potential presence of two resonance peaks produced on either side of that particular frequency.

The performance of a damped resonator is proportional to the mass of the seismic mass. In the event of a modification to the carrier structure of an aircraft, it can nevertheless be difficult to adapt a damped resonator.

In addition, such a damped resonator is used for filtering vibration that occurs substantially at a single given frequency.

Unfortunately, certain aircraft may have a main rotor that rotates at a speed setpoint that can vary during a flight. This situation makes the means for compensating the resulting aerodynamic instabilities more complicated, since for such aircraft it is necessary to attenuate the "broadband" vibration generated by the rotation of the main rotor. An ordinary damped resonator can thus be less effective in this context.

Another type of system comprises an active resonator having an actuator. Such a system consists in controlling the movement of the seismic mass by means of an actuator as a function of the position of the seismic mass.

By way of example, such a resonator is illustrated by Document FR 2 784 350.

That resonator is advantageous. Nevertheless, the damping provided is limited because of its intrinsic instability. A resonator is usually said to be "conditionally stable" insofar as the resonator is stable up to a certain level of excitation. If the resonator is adjusted to counter the vibration exerted on a structure by using an actuator and the dynamic amplification of the seismic mass for generating a force is large, then the operation of the resonator can become unstable and uncontrollable. Under such circumstances, the force exerted by the actuator is limited in order to remain within the stability range of the resonator.

Another active resonator includes a sensor measuring the vibration of the carrier structure fitted with the resonator. The actuator is then controlled as a function of the measured vibration.

Documents U.S. Pat. No. 5,620,068, FR 2 770 825, and U.S. Pat. No. 5,853,144 are also known.

Document U.S. Pat. No. 5,620,068 describes an actuator used for exciting a mass-spring system.

Document FR 2 770 825 describes a system having a resonator, at least one sensor measuring a parameter representative of vibration present in a cabin, and a control unit connected to the resonator and to the sensor.

Document U.S. Pat. No. 5,853,144 describes a helicopter having means for causing control devices to oscillate at a frequency corresponding to an excitation frequency.

Document EP 2 845 799 is also known.

Documents US 2009/020381 and EP 2 039 957 are remote from the field of the invention.

BRIEF SUMMARY OF THE INVENTION

An object of the present invention is thus to provide an innovative resonator.

According to the invention, a resonator for countering vibration of a carrier structure is provided with a seismic mass and a support for fastening to the carrier structure, the resonator including movement means connecting the seismic mass to the support while allowing the seismic mass to perform oscillating movement relative to the support.

In addition, the movement means comprise:

a first electromagnetic assembly comprising one element secured to the seismic mass and another element secured to the support, one of said elements comprising a first electric coil and the other element comprising a first permanent magnet, the first electric coil not being electrically powered;

an electric actuator for acting on a movement of the seismic mass relative to the support, the actuator being connected to a processor unit, the processor unit being configured to power the actuator electrically in variable manner determined as a function firstly of a relative movement between the carrier structure and said seismic mass, and secondly of an individual movement of the carrier structure; and a resilient member interposed between the seismic mass and the support.

The term "oscillating movement" means that the seismic mass moves between two extreme positions, e.g. by moving in translation or by moving in rotation.

The term "the first electric coil not being electrically powered" means that no source of energy other than the first coil injects electrical power into the electric circuit connected to the first electric coil.

The term "the processor unit being configured to power the actuator in variable manner" means that the processor unit determines automatically the current and/or the voltage to be supplied to the actuator, which current and/or voltage may vary over time. Furthermore, the processor unit transmits this power to the actuator in order to cause the seismic mass to move.

Conversely, the first electric coil is not electrically powered.

The term "individual movement" refers to the distance traveled by the carrier structure and the support under the effect of the vibration. The term "relative movement" refers to the distance traveled by the seismic mass relative to the carrier structure and to the support under the effect of the vibration.

Consequently, either the seismic mass carries the first electric coil and the support carries the first magnet, or else the seismic mass carries the first magnet and the support carries the first electric coil.

The resonator is an active damped resonator having at least one electric coil.

Specifically, the resilient member presents a stiffness coefficient that is not negligible. In addition, the first electric coil serves to damp the movement of the seismic mass. Finally, the actuator serves to exert a dynamic force on the seismic mass.

The actuator may bear against the support and/or against the seismic mass and/or against the resilient member, for example.

Introducing the actuator that is electrically powered in variable manner enables the performance of a damped resonator to be improved. Controlling the actuator makes it possible in real time to adapt the resonator to the vibration to which a structure is subjected.

This improvement requires relatively little power for electrically powering the actuator. In addition, the reaction time of the resonator can be minimized, thus enabling the resonator to combat unsteady phenomena.

In addition, the resonator may provide damping to a carrier structure that is subjected to vibration, which damping is optimized compared with a damper that does not have an actuator controlled as a function of two measured parameters.

Specifically, the processor unit controls the current and/or the voltage transmitted to the actuator as a function of two parameters. In order to provide this control, the processor unit can make use in particular of a first gain applied via a first transfer function to the relative movement between the seismic mass and the carrier structure, and a second gain applied via a second transfer function to the individual movement of the carrier structure. This solution goes against technologies that make use solely of a vibratory measurement taken on the carrier structure, for example.

The first gain makes it possible to shift the vibratory mode of the resonator relative to the frequency at which the antiresonance that is to be produced occurs. This shift tends to increase the stability range of the resonator. The second gain may then be maximized in order to optimize the damping that is provided.

The resonator may also include one or more of the following characteristics.

Thus, the actuator may include a piezoelectric member.

For example, the processor unit powers a piezoelectric type actuator with a variable voltage.

Alternatively, or in addition, the actuator may include a second electromagnetic assembly comprising one member secured to the seismic mass and another member secured to the support, one of the members comprising a second electric coil and the other member comprising a second permanent magnet, the second electric coil being connected to the processor unit, the processor unit electrically powering the second electric coil.

The resonator is then an active damped resonator with two electric coils.

For example, the processor unit powers an electromagnetic type actuator with variable current.

In addition, either the seismic mass carries the second electric coil and the support carries the second magnet, or else the seismic mass carries the second magnet and the support carries the second electric coil.

In another aspect, the resonator may include measurement means connected to the processor unit and configured to measure information about the individual movement of the carrier structure.

At each calculation instant, the processor unit may control the current and/or the voltage powering the electric actuator, in particular as a function of the value of the individual movement.

The measurement means may comprise an accelerometer configured to measure an acceleration of the carrier structure, the processor unit including an integrator referred to as the "individual movement" integrator and configured to integrate said acceleration twice in order to obtain value for the individual movement.

Specifically, double integration of the measured acceleration produces the individual movement.

In another aspect, the resonator may include a measurement system connected to the processor unit and configured to measure information about the relative movement between a carrier structure and the seismic mass.

At each calculation instant, the processor unit can thus determine the current and/or the voltage to be delivered to the electric actuator, in particular as a function of the value of the relative movement.

For example, the measurement system may include a voltage sensor configured to measure a voltage referred to as the "measured" voltage.

The voltage sensor may measure this measured voltage across two terminals of the first electric coil or across two terminals of the second electric coil, as appropriate.

Such a voltage sensor may be a voltmeter transmitting a signal representative of the measured voltage measured by the processor unit.

Under such circumstances, the processor unit may include an integrator referred to as the "relative movement" integrator to integrate the quotients of the value of the measured voltage divided by a predetermined constant.

This constant represents an electromagnetic constant of the electric coil used for the measurement and is expressed in newtons per amp.

Specifically, the relative movement $\delta$ is associated with the voltage across the terminals of the first electric coil or of the second electric coil by the following relationship:

$$V/T = \dot{\delta}$$

where "V" represents the measured voltage, "T" represents said constant, "$\dot{\delta}$" represents the time derivative of the relative movement, "/" represents the division sign, and "=" represents the equal sign.

Furthermore, the processor unit may include a computer connected to an electrical power supply electrically powering an electrical power amplifier controlled in current and/or in voltage, the amplifier being connected to the actuator, the computer determining an input voltage as a function of the relative movement and of the individual movement and ordering the power supply to transmit power presenting said input voltage to the amplifier.

By way of example, such an amplifier may be a current amplifier.

The electrical power supply may comprise a storage battery or an electric circuit delivering electrical power. Furthermore, the power supply may comprise an electronic system suitable for adjusting the input voltage applied to the amplifier, such as a member having a variable resistance.

The computer or the relative movement integrator and the individual movement integrator may represent electronic circuits that are different from the processor unit, or they may represent portions of an algorithm stored in a memory and executed by a processor.

Specifically, the actuator is configured to deliver a variable force that may possibly be electromagnetic, in compliance with the following relationships:

$$f_{CA}=H_1(s)*\delta+H_2(s)*X_1$$

where "$f_{CA}$" represents the variable force, "$H_1(s)$" represents a first transfer function of second order with a coefficient referred to as the "first gain" in the form of a constant, "$H_2(s)$" represents a second transfer function of second order with a coefficient referred to as the "second gain" in the form of a constant, "δ" represents the relative movement, "$X_1$" represents the individual movement, "=" represents the equal sign, "*" represents the multiplication sign, and "+" represents the addition sign.

The first gain and the second gain are adjusted as a function of the desired application.

As a function of the individual movement and of the relative movement as measured, the calculator then determines a parameter relating to the input voltage to be applied to the amplifier so that the actuator is powered by current and/or voltage suitable for generating the required variable force $f_{CA}$.

For this purpose, the two transfer functions providing the value of a parameter relating to the input voltage as a function of the individual movement and of the relative movement may be determined by testing or by simulation, and they may be stored in the computer. The computer then applies these two transfer functions on each calculation step in order to generate an order that is given to the power supply to transmit the appropriate power to the amplifier. For example, the computer transmits a signal to an electric circuit of the power supply in order to set the resistance of this electric circuit so as to adjust the input voltage applied to the amplifier.

Furthermore, the seismic mass may include a shaft carrying a weight, the weight projecting from the shaft.

The term "the weight projecting from the shaft" means that the weight extends from the shaft in at least one direction. The weight may then present thickness in a plane that is greater than the thickness of the shaft in the same plane.

For example, the weight may present mass greater than the mass of the shaft.

The shaft optionally extends longitudinally on either side of the weight, and the first electromagnetic assembly and the actuator may co-operate with the shaft and be longitudinally situated on respective sides of the weight.

The term "co-operate with the shaft" means that the electric coil or the permanent magnet of one of electromagnetic assembly is fastened to the shaft, or that a piezoelectric member is connected to the shaft.

Alternatively, the shaft optionally projects longitudinally from at least one side of the weight, and the first electromagnetic assembly and the actuator may co-operate with the shaft, both being longitudinally situated on the same side of the weight.

Furthermore, at least the first electromagnetic assembly or the actuator may co-operate with the weight.

Furthermore, said resilient member may comprise at least one spring.

Alternatively, or in addition, said resilient member may comprise at least one flexible blade.

In addition to a resonator, the invention provides an aircraft having a carrier structure that is subjected to vibration.

The aircraft then includes a resonator of the invention, the support of the resonator being secured to the carrier structure.

The invention also provides a method for countering vibration of a carrier structure with a resonator of the above-described type, said method comprising a step of electrically powering said actuator with variable electrical power determined as a function firstly of a relative movement between the carrier structure and said seismic mass, and secondly of an individual movement of the carrier structure.

In an aspect, said actuator includes a second electromagnetic assembly comprising one member secured to the seismic mass and another member secured to the support, one of said members comprising a second electric coil and the other member comprising a second permanent magnet, the second electric coil being connected to said processor unit, and said method includes a step of the processor unit electrically powering the second electric coil.

In an aspect, in order to measure said individual movement the method includes a step of measuring an acceleration of said carrier structure, and an integration step during which said acceleration is integrated twice in order to obtain a value for said individual movement.

In an aspect, in order to measure said relative movement, the method includes a step of measuring a voltage, referred to for convenience as the "measured" voltage, across two terminals of the first electric coil or across two terminals of a second electric coil of the actuator.

In aspect, the method includes a step of integrating the quotient of the value of said measured voltage divided by a predetermined constant.

In an aspect, an electrical power supply electrically powers a controlled electrical power amplifier, said amplifier is connected to said actuator, and said method includes a step of determining an input voltage as a function of said relative movement and of said individual movement, and a step of generating an order ordering said electrical power supply to transmit a signal presenting said input voltage to the amplifier.

BRIEF DESCRIPTION OF THE DRAWINGS

The invention and its advantages appear in greater detail from the context of the following description of examples given by way of illustration and with reference to the accompanying figures, in which:

FIGS. 2 to 5 are diagrams showing a resonator comprising a spring resilient member;

FIG. 7 is a diagram showing the performance of the resonator.

Elements presents in more than one of the figures are given the same references in each of them.

DETAILED DESCRIPTION OF THE INVENTION

Figure 1:
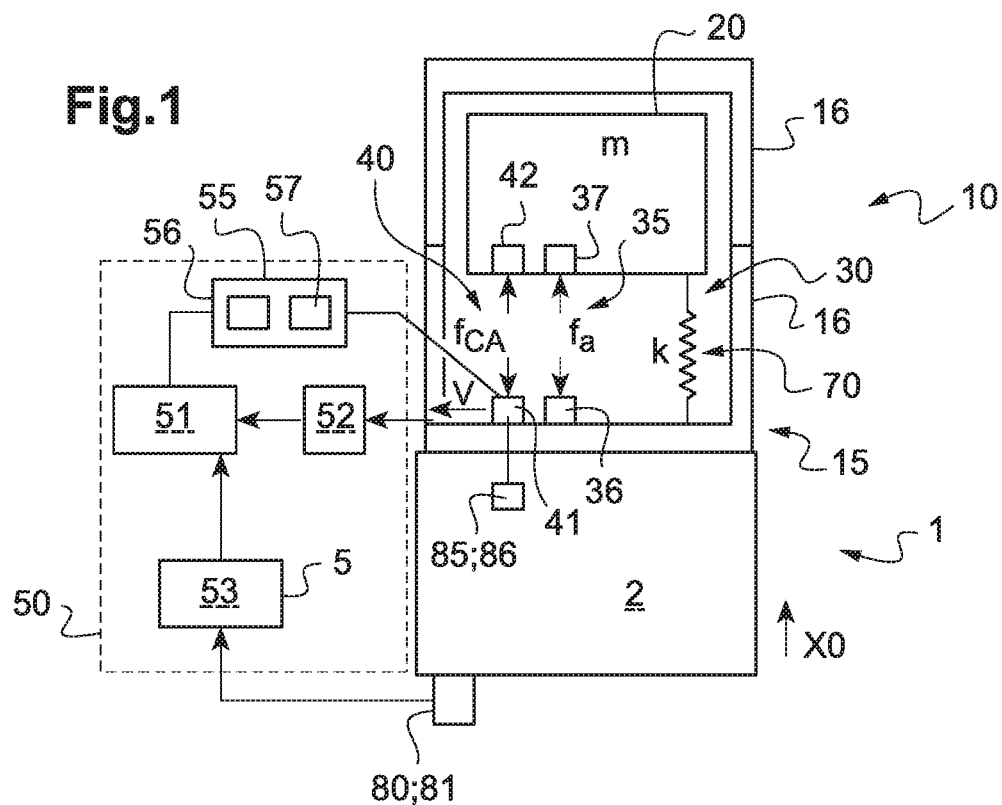
FIG. 1 is a diagram showing an aircraft of the invention.

FIG. 1 shows an aircraft 1 of the invention. The aircraft is provided with a structure referred to as a "carrier" structure 2. The carrier structure 2 is subjected to vibration tending to move the carrier structure along a direction X0.

Under such circumstances, the aircraft 1 has a resonator 10 of the invention for minimizing this vibration, at least at certain frequencies.

The resonator 10 comprises a support 15 secured to the carrier structure 2 by conventional means that are not shown. For example, the support 15 may be screw-fastened, adhesively-bonded, welded, or indeed riveted to the carrier structure.

The support 15 may represent a casing defining a hollow inside space of the resonator 10. Under such circumstances, the support may comprise a single mechanical part 16 or a plurality of parts 16 that are fastened to one another.

Furthermore, the resonator 10 is provided with a seismic mass 20. The term "seismic mass" is used to mean a mechanical unit that performs oscillating motion relative to the support 15. The seismic mass 20 presents a mass $\underline{m}$.

Furthermore, the resonator 10 includes movement means 30 connecting the seismic mass 20 to the support 15. Where appropriate, the seismic mass is arranged in the inside space defined by the support 15.

The movement means 30 allow the seismic mass 20 to perform oscillating movement relative to the support 15.

Under such circumstances, the movement means 30 comprise a resilient member 70 presenting non-negligible stiffness $\underline{k}$. The resilient member 70 is interposed between the seismic mass 20 and the support 15.

Furthermore, the movement means 30 comprise a first electromagnetic assembly 35 interposed between the seismic mass 20 and the support 15. The first electromagnetic assembly generates a first electromagnetic force fa and presents non-negligible damping.

For this purpose, the first electromagnetic assembly comprises one element that is secured to the seismic mass 20 and another element that is secured to the support 15. In particular, one of these two elements comprises a first electric coil 36 and the other element of these two elements comprises a first permanent magnet 37.

In addition, the first electric coil 36 is not electrically powered. The terminals 870 and 880 of the first electric coil 36 are connected by way of example to a first electric circuit shown in FIG. 2 that does not have an electrical power supply. This first electric circuit may present an electrical resistance that is manually adjustable by an operator prior to flight by using a potentiometer 38. Prior to flight, the operator can adjust the value in ohms of the resistance generated by the potentiometer 38 so as to have the effect of manually adjusting the damping coefficient induced by the first electric coil.

Under such circumstances, and with reference to FIG. 1, the first electromagnetic force fa is not automatically adjustable while the resonator is in operation, but can be adjusted by an operator when installing the resonator on the carrier structure 2. This electromagnetic force fa is sinusoidal if the first permanent magnet 37 moves through the first electric coil 36 sinusoidally.

The movement means 30 also comprise an electric actuator 40 interposed between the seismic mass 20 and the support 15. The actuator 40 may present non-negligible damping. The actuator 40 generates a second force fca that is automatically and dynamically variable as a function of the values of two parameters.

For this purpose, the actuator 40 may have a second electromagnetic assembly. The second electromagnetic assembly comprises one member secured to the seismic mass 20 and another member secured to the support 15. One of these two members comprises a second electric coil 41 and the other members of these two members comprises a second permanent magnet 42. The second electric coil 41 is connected to a processor unit 50.

Figure 2:
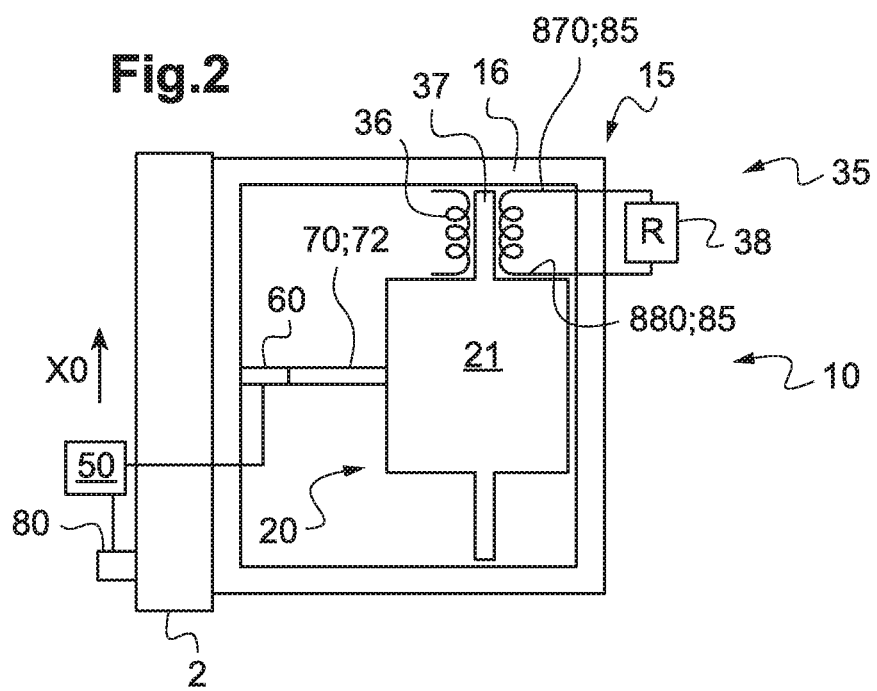

In the variant of FIG. 2, the actuator may comprise a piezoelectric member 60 fastened to the support. In addition, the piezoelectric member 60 is mechanically connected directly or indirectly to the seismic mass, e.g. indirectly via the resilient member 70. The piezoelectric member 60 is also electrically connected to the processor unit 50.

With reference to FIG. 1, and regardless of the nature of the actuator, the processor unit 50 powers the actuator electrically, i.e. the second electric coil 41 or the piezoelectric member, with electricity presenting adjustable current and/or voltage. The current and the voltage are adjustable automatically by the processor unit as a function of the individual movement of the carrier structure and as a function of the relative movement of the carrier structure and of the seismic mass (i.e. their movement relative to each other). Under such circumstances, the second force fca is automatically adjustable without human intervention while the resonator is in operation.

By way of example, the processor unit 50 may comprise a processor, an integrated circuit, a programmable system, a logic circuit, these examples not limiting the scope to be given to the term "processor unit". The processor unit may be remote from the equipment comprising the support and a first electromagnetic assembly 35 and the actuator 40. The processor unit is then connected to that equipment.

The processor unit 50 may in particular comprise a computer 51 and/or an integrator 53 for integrating the individual movement and/or an integrator 52 for integrating the relative movement. These various subassemblies may for example represent a variety of electronic circuits connected to one another, or indeed code segments of an algorithm in memory.

In order to adjust the second force fca, the resonator 10 may include measurement means 80. The measurement means are connected to the processor unit 50 via a wired or wireless connection.

Under such circumstances, the equipment means 80 are configured to measure information about the individual movement of a carrier structure 2 in the direction X0. The measurement means 80 may be remote from equipment comprising the support and a first electromagnetic assembly 35 and the actuator 40.

The measurement means 80 may comprise an accelerometer 81 configured to measure an acceleration of the carrier structure 2. The processor unit 50 then includes an integrator 53 referred to as the "individual movement" integrator 53 that is connected to the accelerometer 81 and to a computer 51. The accelerometer 81 delivers a signal representative of the measured acceleration to the individual movement integrator 53. The individual movement integrator 53 integrates the measured acceleration twice over a time interval in order to obtain a value for the individual movement of the carrier structure. The value of the individual movement is transmitted to the computer 51.

The resonator 10 may also include a measurement system 85 connected to the processor unit 50. The measurement system 85 measures information about the relative movement between the carrier structure 2 and the seismic mass 20.

The measurement system 85 may be remote from equipment comprising the support and a first electromagnetic assembly 35 and the actuator 40.

Under such circumstances, the measurement system 85 may include a voltage sensor 86 that measures a voltage referred to as the "measured" voltage across two terminals 87 and 88 of the second electric coil 41 as can be seen in FIG. 3, or, where appropriate, across the terminals 870 and 880 of the first electric coil 36, as can be seen in FIG. 2.

Consequently, and with reference to FIG. 1, the processor unit 50 may include an integrator referred to as the "relative movement" integrator 52.

This relative movement integrator 52 integrates the quotient of the measured voltage V divided by a constant T. The relative movement is thus equal to the result of this integration.

By way of example, each of the above-described integrators may be in the form of a conventional electric circuit, or indeed a mathematical function stored in a memory of the processor unit and executed by a processor or the equivalent of the processor unit.

Furthermore, the processor unit 50 thus includes a computer 51 configured to determine a value for the adjustable current and/or voltage of the electrical power to be supplied to the actuator as a function of the relative movement and of the individual movement.

The computer may comprise a processor or the equivalent, a memory, an input card connected to the measurement means and also to the measurement system and to the processor, and an output card connected to the processor and to an electrical power supply.

In order to produce the electrical power presenting the required current and/or voltage to be obtained, the processor unit controls a second electric circuit 55. In particular, the processor unit controls an electrical power supply 56 in order to produce an electrical signal presenting an input voltage that is applied to an amplifier 57.

For example, at each calculation step, the computer applies a mathematical model as determined by testing or by simulation in order to determine a parameter that is representative of the input voltage as a function of the value of the relative movement and the value of the individual movement at this calculation step. A signal is applied to the power supply 56 so that the required electrical signal is delivered to an amplifier 57. The amplifier 57 then produces the required variable electric power which it transmits to the actuator.

Consequently, during the flight of the aircraft, the processor unit continuously adapts the current and/or the voltage applied to the actuator as a function of the individual movement of the carrier structure 2, and as a function of the movement of the carrier structure 2 relative to the seismic mass 20.

Figure 5:
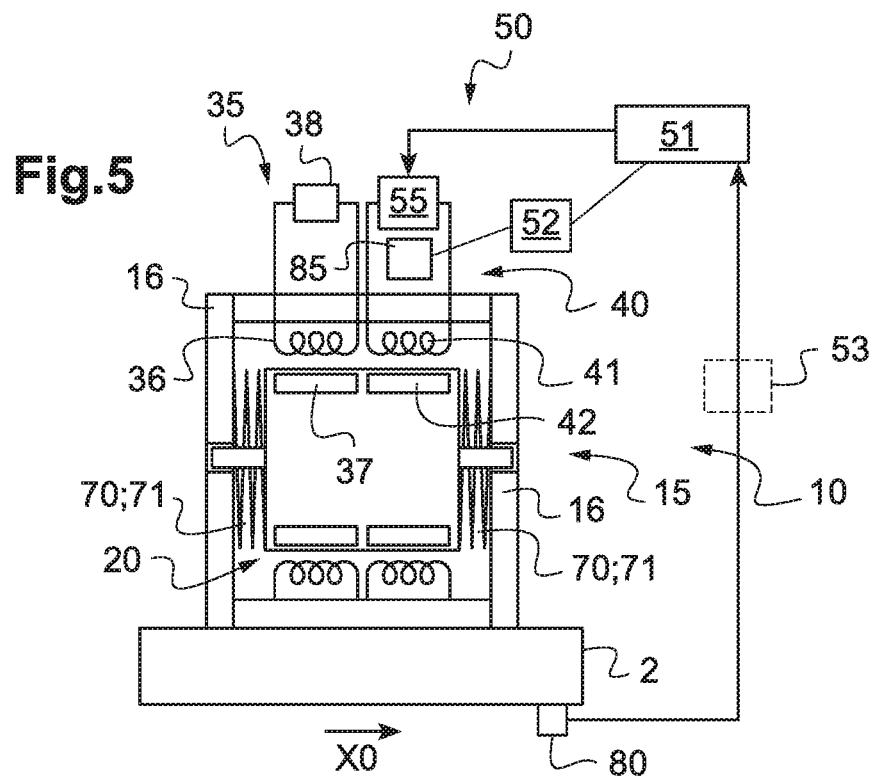

Furthermore, in the embodiment shown in FIGS. 3 to 5, the resilient member 70 may comprise at least one spring 71. For example, two springs are interposed between the seismic mass 20 and the support 15. In particular, the two springs may be situated on respective sides of a section of the seismic mass in a movement direction of the seismic mass.

Figure 6:
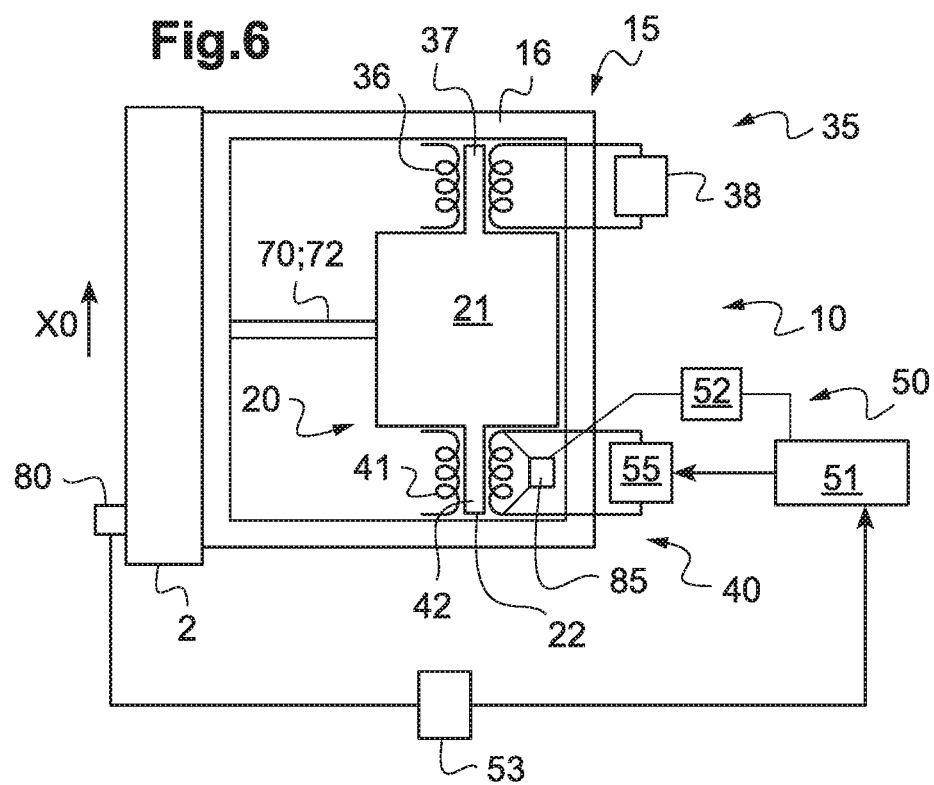
FIG. 6 is a diagram showing a resonator comprising a blade resilient member.

In the embodiment of FIG. 6 and of FIG. 2, the resilient member 70 may comprise at least one spring blade 72. The spring blade 72 extends from a first end that is fastened to the support 15 to a second that carries the seismic mass 20.

Furthermore, and with reference to FIG. 3, the seismic mass 20 may comprise a shaft 22 carrying a weight 21. The weight 21 projects relative to the shaft 22.

The shaft 22 can serve to guide the movement of the seismic mass 20.

Nevertheless, and in another variant, such a shaft is optional if the resilient members provide the stiffness needed to ensure that the mass moves along one direction only: guidance may then be provided directly between the seismic mass 20 and the support 15. For example, the resilient members could then comprise plates that are deformable along only one direction.

In a variant having a shaft, the shaft 22 may also serve to carry an element of the first electromagnetic assembly and/or to carry a member of the second electromagnetic assembly, if any, and may be fastened to a piezoelectric member.

Thus, the shaft 22 may extend lengthwise between two end zones 25. At least one end zone 25 may be carried by the support 15 via a bearing 26 giving the seismic mass freedom to move relative to the support.

In particular, the shaft 22 may pass through the weight. One end zone is then situated at a side of the weight 21 referred to as the left side G in FIG. 3, the other end zone being situated beside a side of the weight 21 referred to as the right side D. Each end zone 25 of the shaft 22 may then be carried by a support as shown in FIG. 3.

Furthermore, and in the variant of FIG. 3, the first electromagnetic assembly 35 and the actuator 40 co-operate with the shaft 22 of the seismic mass 20. The first electromagnetic assembly 35 and the second electromagnetic assembly of the actuator 40 are then in this FIG. 3 situated on respective longitudinally opposite sides of the weight 21.

For example, the first magnet 37 is carried by the end zone of the shaft situated on the right side of the weight, and the second magnet 42 is carried by the end zone of the shaft situated on the left side of the weight. The first electric coil 36 and the second electric coil 41 are then carried by the support.

Alternatively, at least one electric coil is carried by the shaft 22.

In the variant of FIG. 4, the first electromagnetic assembly 35 and the actuator 40 are both situated longitudinally on the same side D of the weight 21, i.e. the right side in this example.

In the variant of FIG. 5, at least the first electromagnetic assembly 35 or the actuator 50 co-operates with the weight 21.

For example, the first magnet 37 and the second magnet 42 are carried by the weight. The first electric coil 36 and the second electric coil 41 are then carried by the support 15.

Alternatively, at least one electric coil is carried by the shaft 22.

FIG. 7 shows the performance of a resonator of the invention. FIG. 7 is a graph plotting the frequencies of vibration of a carrier structure along the abscissa axis and the amplitude of the vibration up the ordinate axis, e.g. expressed in decibels.

The first curve C1 shows the vibration without a resonator.

The second curve C2 shows the vibration when applying a conventional damped resonator.

Finally, the third curve C3 shows the vibration that occurs when applying a resonator of the invention.

The first curve C1 reaches a large extremum at a frequency f0 about which it is desired to minimize the response of the structure.

A conventional damped resonator adjusted on this frequency enables the extremum that is reached to be reduced. Nevertheless, the second curve C2 remains identical with the curve C1 for the other frequencies.

With reference to the third curve C3, the damping provided by the resonator of the invention on the mode of vibration of the carrier structure at the set frequency f0 is greater than the damping provided by the conventional damped resonator, for equal seismic mass. Under such circumstances, the third curve C3 lies under the second curve C2 at the set frequency f0. Specifically, the mode of vibration produced by the second electric coil is offset to a frequency f1, which frequency f1 is adjustable by adjusting the first gain involved in the first transfer function H1(s), instead of being at the frequency f0, because of the way the actuator is controlled as a function in particular of the relative movement of the carrier structure relative to the seismic mass. Under such circumstances, the resonator presents optimized control stability, making it possible to make use of high levels of gain so that the damping provided at the frequency f0 is optimized in comparison with an active resonator set to the frequency close to f0.

Furthermore, the actuator makes it possible to reduce vibration over a broad frequency band BFL, unlike a conventional damped resonator tuned to the frequency of the mode of vibration that is to be controlled.

Furthermore, the resonator is relatively safe. Specifically, if the procedure for controlling the second electric coil 41 fails, the resonator will at least achieve the performance represented by the second curve C2.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

By way of example, the variants of FIGS. 3 to 6 may have a piezoelectric actuator instead of a second electromagnetic assembly.

What is claimed is:

1. A resonator for countering vibration of a carrier structure, the resonator being provided with a seismic mass and a support for fastening to the carrier structure, the resonator including movement means connecting the seismic mass to the support while allowing the seismic mass to perform oscillating movement relative to the support, wherein the movement means comprise:
   a first electromagnetic assembly comprising one element secured to the seismic mass and another element secured to the support, one of the elements comprising a first electric coil and the other element comprising a first permanent magnet, the first electric coil not being electrically powered;
   an electric actuator for acting on a movement of the seismic mass relative to the support, the actuator being connected to a processor unit, the processor unit being configured to power the actuator electrically in variable manner determined as a function firstly of a relative movement between the carrier structure and the seismic mass, and secondly of an individual movement of the carrier structure; and
   a resilient member interposed between the seismic mass and the support.

2. A resonator according to claim 1, wherein the actuator comprises a piezoelectric member fastened to the support.

3. A resonator according to claim 1, wherein the actuator includes a second electromagnetic assembly comprising one member secured to the seismic mass and another member secured to the support, one of the members comprising a second electric coil and the other member comprising a second permanent magnet, the second electric coil being connected to the processor unit, the processor unit electrically powering the second electric coil.

4. A resonator according to claim 1, wherein the resonator includes measurement means connected to the processor unit and configured to measure information about the individual movement.

5. A resonator according to claim 4, wherein the measurement means comprise an accelerometer configured to measure an acceleration of the carrier structure, the processor unit including an integrator referred to as the "individual movement" integrator and configured to integrate the acceleration twice in order to obtain value for the individual movement.

6. A resonator according to claim 1, wherein the resonator includes a measurement system connected to the processor unit and configured to measure information about the relative movement.

7. A resonator according to claim 6, wherein the measurement system includes a voltage sensor configured to measure a voltage across two terminals of the first electric coil, and referred to as the "measured" voltage.

8. A resonator according to claim 7, wherein the processor unit includes an integrator referred to as the "relative movement" integrator to integrate the quotients of a value of the measured voltage divided by a predetermined constant.

9. A resonator according to claim 6, wherein the measurement system includes a voltage sensor configured to measure an electrical voltage across two terminals of a second electric coil of the actuator, and referred to as the "measured" voltage.

10. A resonator according to claim 1, wherein the processor unit includes a computer connected to an electrical power supply electrically powering a controlled electrical power amplifier, the amplifier being connected to the actuator, the computer determining an input voltage as a function of the relative movement and of the individual movement and ordering the power supply to transmit power presenting the input voltage to the amplifier.

11. A resonator according to claim 1, wherein the seismic mass includes a shaft carrying a weight, the weight projecting from the shaft.

12. A resonator according to claim 11, wherein the shaft extends longitudinally on either side of the weight, and the first electromagnetic assembly and the actuator co-operate with the shaft and are longitudinally situated respectively on either side of the weight.

13. A resonator according to claim 11, wherein the shaft extends longitudinally from at least one side of the weight, and the first electromagnetic assembly and the actuator co-operate with the shaft and are longitudinally situated on a same side of the weight.

14. A resonator according to claim 1, wherein at least the first electromagnetic assembly or the actuator co-operate with the weight.

15. A resonator according to claim 1, wherein the resilient member may comprise at least one spring.

16. A resonator according to claim 1, wherein the resilient member may comprise at least one flexible blade.

17. An aircraft having a carrier structure that is subjected to vibration, wherein the aircraft includes a resonator according to claim 1, the support being secured to the carrier structure.

18. A method of countering vibration of a carrier structure by means of a resonator, the resonator being provided with a seismic mass and a support for fastening to the carrier structure, the resonator including movement means connecting the seismic mass to the support while allowing the seismic mass to perform oscillating movement relative to the support, wherein the movement means comprise:

a first electromagnetic assembly comprising one element secured to the seismic mass and another element secured to the support, one of the elements comprising a first electric coil and the other element comprising a first permanent magnet, the first electric coil not being electrically powered;

an electric actuator for acting on a movement of the seismic mass relative to the support, the actuator being connected to a processor unit, the processor unit being configured to power the actuator electrically in variable manner determined as a function firstly of a relative movement between the carrier structure and the seismic mass, and secondly of an individual movement of the carrier structure; and a resilient member interposed between the seismic mass and the support, the method comprising a step of electrically powering the actuator with variable electrical power determined as a function firstly of the relative movement between the carrier structure and the seismic mass, and secondly of the individual movement of the carrier structure.

19. A method according to claim 18, wherein the actuator includes a second electromagnetic assembly comprising one member secured to the seismic mass and another member secured to the support, one of the members comprising a second electric coil and the other member comprising a second permanent magnet, the second electric coil being connected to the processor unit, and the method includes a step of the processor unit electrically powering the second electric coil.

20. A method according to claim 18, wherein in order to measure the individual movement the method includes a step of measuring an acceleration of the carrier structure, and an integration step during which the acceleration is integrated twice in order to obtain a value for the individual movement.

21. A method according to claim 18, wherein in order to measure the relative movement, the method includes a step of measuring a voltage referred to as the "measured" voltage across two terminals of the first electric coil or across two terminals of a second electric coil of the actuator and wherein the method includes a step of integrating the quotient of the value of the measured voltage divided by a predetermined constant.

22. A method according to claim 18, wherein an electrical power supply electrically powers a controlled electrical power amplifier, the amplifier is connected to the actuator, and the method includes a step of determining an input voltage as a function of the relative movement and of the individual movement, and a step of generating an order ordering the electrical power supply to transmit a signal presenting the input voltage to the amplifier.

23. A resonator for countering vibration of a carrier structure, the resonator being provided with a seismic mass and a support fastenable to the carrier structure, the resonator including a movement assembly connecting the seismic mass to the support while allowing the seismic mass to perform oscillating movement relative to the support, wherein the movement assembly comprising:

a first electromagnetic assembly comprising a first electric coil secured to one of the seismic mass and the support and a first permanent magnet secured to the other of the support and the seismic mass, the first electric coil not being electrically powered;

a variably electric powered actuator for acting on a movement of the seismic mass relative to the support, the actuator connectable to a processor unit capable of variably electrically powering the actuator being variably electrically powered as a function firstly of a relative movement between the carrier structure and the seismic mass, and secondly of an individual movement of the carrier structure; and a resilient member interposed between the seismic mass and the support.

* * * * *